(12) United States Patent
Choi

(10) Patent No.: US 7,554,688 B2
(45) Date of Patent: Jun. 30, 2009

(54) METHOD AND APPARATUS FOR PRINTING IMAGE USING MEMORY CARD

(75) Inventor: Seung Young Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 951 days.

(21) Appl. No.: 10/600,338

(22) Filed: Jun. 23, 2003

(65) Prior Publication Data

US 2004/0008374 A1 Jan. 15, 2004

(30) Foreign Application Priority Data

Jun. 25, 2002 (KR) ............... 10-2002-0035669

(51) Int. Cl.
G06F 15/00 (2006.01)
G06F 13/00 (2006.01)

(52) U.S. Cl. ............... 358/1.16; 358/1.1; 358/1.15

(58) Field of Classification Search ............ 358/1.15, 358/1.16, 1.1, 1.2; 711/115; 400/88
See application file for complete search history.

(56) References Cited

U.S. PATENT DOCUMENTS

| | | | | |
|---|---|---|---|---|
| 6,453,078 | B2 * | 9/2002 | Bubie et al. | 382/305 |
| 6,476,929 | B1 * | 11/2002 | Tanaka | 358/1.1 |
| 6,498,658 | B1 * | 12/2002 | Sekikawa | 358/1.16 |
| 6,553,459 | B1 * | 4/2003 | Silverbrook et al. | 711/115 |
| 6,937,356 | B1 * | 8/2005 | Ito et al. | 358/1.16 |
| 2001/0003186 | A1 * | 6/2001 | DeStefano | 707/526 |
| 2005/0195435 | A1 * | 9/2005 | Kojima et al. | 358/1.16 |
| 2007/0177822 | A1 * | 8/2007 | Uno | 382/305 |
| 2008/0174818 | A1 * | 7/2008 | Kanamoto | 358/1.15 |

FOREIGN PATENT DOCUMENTS

| | | |
|---|---|---|
| EP | 930 757 | 7/1999 |
| EP | 1 176 500 | 1/2002 |
| EP | 1 182 860 | 2/2002 |
| JP | 9-186812 | 7/1997 |
| JP | 11321011 | 11/1999 |
| JP | 11327865 | 11/1999 |
| JP | 2001-138584 | 5/2001 |
| JP | 2002-314906 | 10/2002 |
| WO | 02/3318 | 1/2002 |

OTHER PUBLICATIONS

Japanese Office Action dated Aug. 23, 2005 issued in Japanese Patent Application No. 2003-181596 corresponding to the above-identified pending US patent application, 2 pages.

* cited by examiner

*Primary Examiner*—Kimberly A Williams
(74) *Attorney, Agent, or Firm*—Staas & Halsey LLP

(57) ABSTRACT

A computer system printing an image using an image printing unit, which prints the image read from an external memory card, and a personal computer with a monitor connected to the image printing unit. If the memory card with the image data has been inserted into the image printing unit and the image printing unit has been connected to the personal computer, read image data including an image number and a user selected image number are transmitted to the personal computer for displaying on the monitor. The image printing unit prints the displayed image data corresponding to the user selected image number in response to a user print request at the image printing unit.

20 Claims, 7 Drawing Sheets

METHOD AND APPARATUS FOR PRINTING IMAGE USING MEMORY CARD

CROSS-REFERENCE TO RELATED APPLICATIONS

This application claims the benefit of Korean Patent Application No. 2002-35669, filed on Jun. 25, 2002, the disclosure of which is incorporated herein in its entirety by reference.

BACKGROUND OF THE INVENTION

1. Field of the Invention

The present invention relates to printing an image stored in a memory card, and more particularly, to a method and apparatus for printing an image stored in a memory card using a personal computer and a monitor connected to the personal computer.

2. Description of the Related Art

Hereinafter, a multi-function peripheral (MFP) or a digital photo printer (DPP) having a memory card interface section is referred to as an image printing apparatus. The following description concerns an image printing method performed by a conventional image printing apparatus.

A conventional image printing apparatus, which can read and print data stored in a memory card, operates as follows to print image data desired by a user from among a plurality of image data stored in the memory card. When a conventional image printing apparatus includes a thin film transistor (TFT)-liquid crystal display (LCD), a user scrolls through images stored in a memory card until a desired image is displayed on the TFT-LCD and then prints the desired image when it is displayed, by operating keys. Here, the keys are provided in a user interface section of the image printing apparatus. According to such a conventional image printing method, an expensive TFT-LCD is required to print a desired image stored in a memory card.

When a conventional image printing apparatus does not include a TFT-LCD and is connected to a personal computer, a user starts a special application program installed in the personal computer and operates a mouse or a keyboard of the personal computer, instead of operating the keys of the user interface section of the image printing apparatus, to scroll through images displayed on a monitor connected to the personal computer to find a desired image from among images stored in a memory card and to print the desired displayed image. Here, after reading image information corresponding to the image displayed on the monitor from the memory card, the image printing apparatus converts the image information into a Cyan-Magenta-Yellow-Black (CMYK) format using a data converter, and outputs data having the CMYK format to an image printing engine of the image printing apparatus, thereby printing the image displayed on the monitor. Accordingly, such a conventional image printing method is somewhat inconvenient because the user has to interface with the special application program executing on the personal computer. In addition, when original image data is read from the memory card, an image, which is not a thumbnail image, is displayed on a full screen of the monitor. In this case, other activities of the user or another user using the personal computer are disturbed.

SUMMARY OF THE INVENTION

The present invention provides a method of printing an image using a memory card in which images read from the memory card can be scrolled through on a monitor and a desired image from among them can be easily and inexpensively printed through the monitor without operating a personal computer.

The present invention also provides an apparatus printing an image using a memory card according to the above method.

Additional aspects and advantages of the invention will be set forth in part in the description which follows and, in part, will be obvious from the description, or may be learned by practice of the invention.

The present invention may be achieved by a method of printing an image using an image printing unit, which prints an image corresponding to image data read from an external memory card, and a personal computer, which can be connected to the image printing unit and has a monitor. The method comprises determining whether the memory card with the image data has been inserted into the image printing unit and whether the image printing unit has been connected to the personal computer; if determined that the memory card with the image data has been inserted and the image printing unit has been connected to the personal computer, checking or generating diminished (i.e., compressing) image data and transmitting the diminished image data to the personal computer together with an image number; storing the diminished image data and the image number, which are transmitted from the image printing unit; displaying image data corresponding to an image number, which is selected by a user at the image printing unit and transmitted from the image printing unit, from among the stored diminished image data, on the monitor; determining whether the user requests to print the image data displayed on the monitor and going back to the displaying of the image data if determined that the user does not request to print the image data displayed on the monitor; and printing the displayed image data if determined that the user requests to print the displayed image data.

The present invention may be also achieved by an apparatus/system printing an image, the apparatus/system comprising an image printing unit, which prints an image corresponding to image data read from an external memory card, and a monitor of a personal computer which can be connected to the image printing unit. The image printing unit comprises a print preparing section, which determines whether the memory card with the image data has been inserted into the image printing unit and whether the image printing unit has been connected to the personal computer, and outputs the result of determination as a control signal; a data processor, which image processes the image data read from the memory card, checks or generates diminished (compressed) image data in response to the control signal, and transmits the diminished image data to the personal computer together with an image number; a key operating section, which is operated by a user to select the image number and to output a print request signal requesting to print an image; and a printing section, which prints the image data read from the memory card in response to the print request signal. The personal computer comprises a storage section storing the diminished image data and the image number, which are transmitted from the data processor of the image printing unit; and a display controller, which reads image data, which corresponds to the image number selected in the key operating section of the image printing unit, from the storage section and displays the read image data on the monitor.

BRIEF DESCRIPTION OF THE DRAWINGS

The above and/or other aspects and advantages of the present invention will become apparent and more readily appreciated from the following description of the embodiments taken in conjunction with the accompanying drawings in which.

DETAILED DESCRIPTION OF THE PREFERRED EMBODIMENTS

Figure 1:
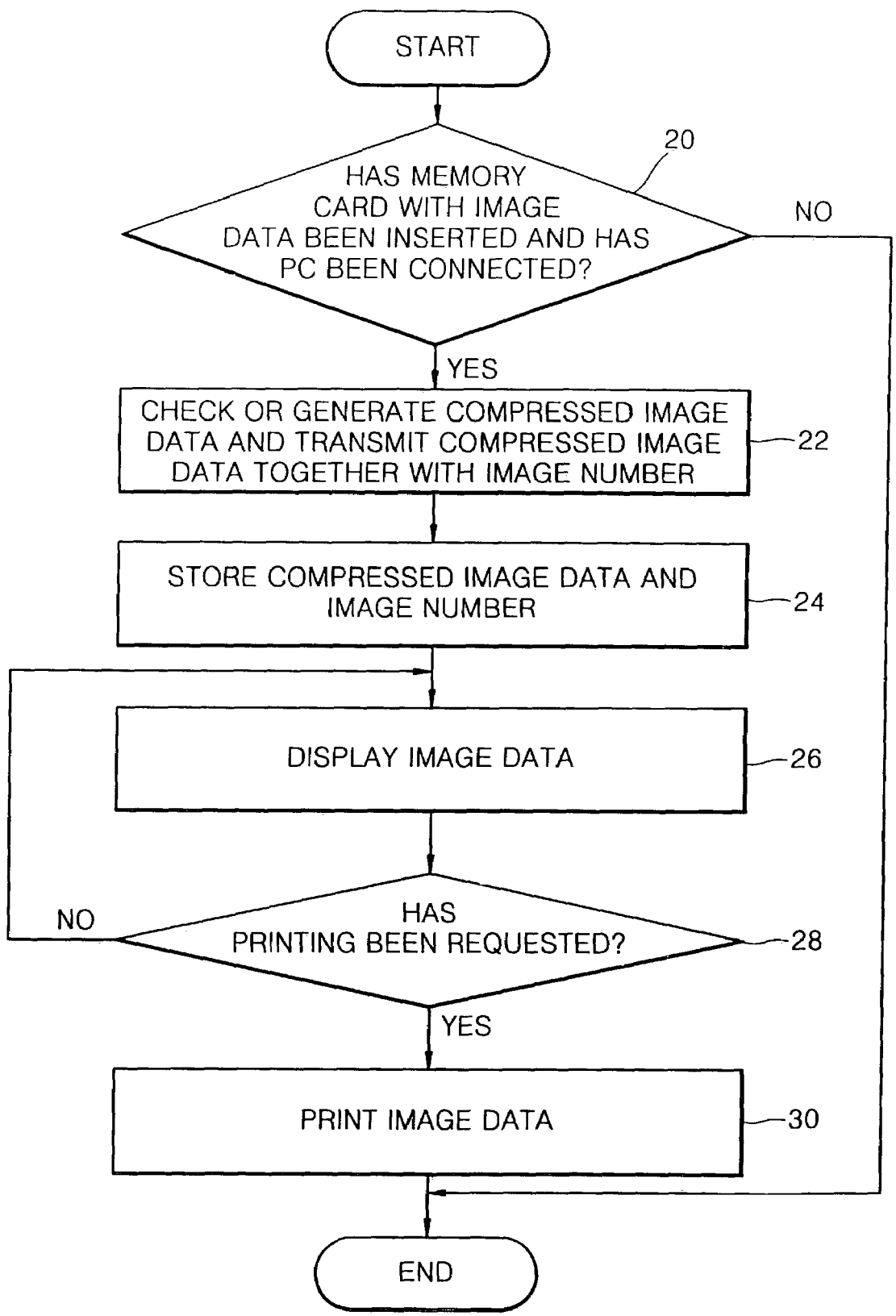
FIG. 1 is a flowchart of printing an image using a memory card, according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 2:
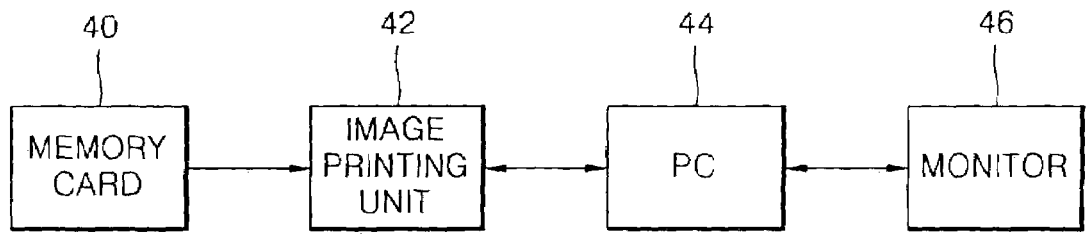
FIG. 2 is a control block diagram of an apparatus printing an image according to the method shown in FIG. 1.

FIG. 1 is a flowchart of printing an image using a memory card, according to an embodiment of the present invention. The method comprises, at operation 20, preparing to print an image; at operations 22 through 26 transmitting, storing, and displaying diminished (compressed) image data; and, at operations 28 through 30, printing the image data. FIG. 2 is a control block diagram of an apparatus printing an image according to the method shown in FIG. 1.

The method of printing an image shown in FIG. 1 is performed by an image printing unit 42 and a personal computer (PC) 44 as shown in FIG. 2. The image printing unit 42 prints an image corresponding to image data read from an external memory card 40 and is connected to a monitor 46 through the PC 44. For example, the image printing unit 42 is a multi-function peripheral (MFP) or a digital photo printer (DPP), which provides an interface section (not shown) interfacing with the memory card 40. Typically, the MFP can perform at least two functions from among a scanning function, a printing function, a faxing function, and a copying function.

Figure 3:
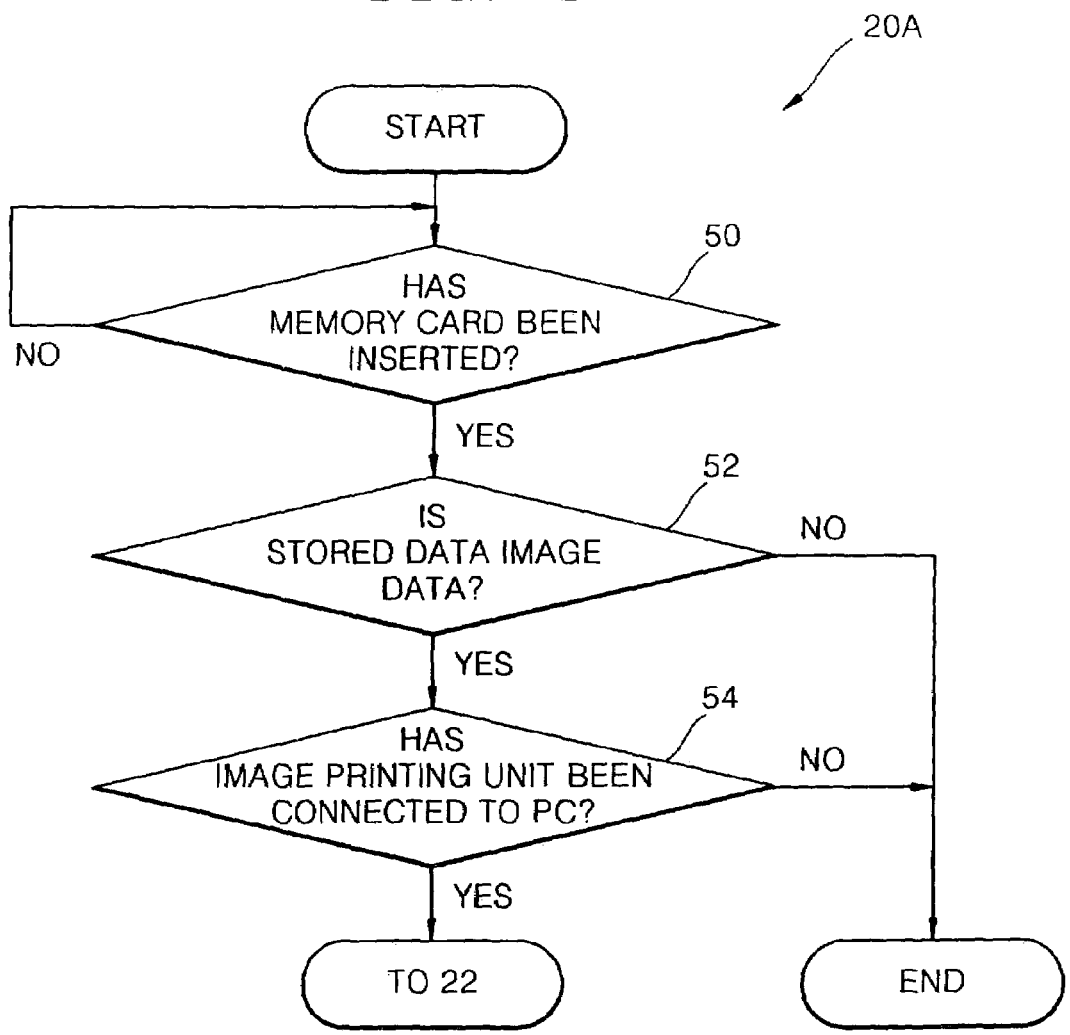
FIG. 3 is a flowchart of an embodiment of operation 20 shown in FIG. 1.

In FIG. 1, at operation 20, it is determined whether the memory card 40 having image data has been inserted into the image printing unit 42, and whether the image printing unit 42 has been connected to the PC 44. FIG. 3 is a flowchart of FIG. 1 operation 20, according to an embodiment 20A of the present invention. In FIG. 3, the operations 50 through 54 determine whether the memory card 40 has been inserted into the image printing unit 42, determine the type of stored data, and determine a connection state of the image printing unit 42.

More specifically, at operation 50, it is determined whether the memory card 40 has been inserted into the image printing unit 42. If, at operation 50, it is determined that the memory card 40 has been inserted into the image printing unit 42, at operation 52, it is determined whether data stored in the memory card 40 is image data. If, at operation 52, it is determined that the data stored in the memory card 40 is not image data, the method as shown in FIGS. 1 and 3 ends. For example, if, at operation 52, it is determined that data stored in the memory card 40 is not image data, but text data, the method as shown in FIGS. 1 and 3 ends.

However, if, at operation 52, it is determined that the data stored in the memory card 40 is image data, at operation 54, it is determined whether the image printing unit 42 has been connected to the PC 44. If, at operation 54, it is determined that the image printing unit 42 has been connected to the PC 44, the method progresses to FIG. 1 operation 22. However, if, at operation 54, it is determined that the image printing unit 42 has not been connected to the PC 44, the method as shown in FIGS. 1 and 3 ends.

In FIG. 1, if, at operation 20, it is determined that the memory card 40 with image data has been inserted into the image printing unit 42, and that the image printing unit 42 has been connected to the PC 44, at operation 22, it is checked whether diminished (compressed) image data exists, and if diminished image data does not exist, diminished image data is generated and the diminished image data is transmitted from the image printing unit 42 to the PC 44 together with an image number. Typically, the image printing unit 42 generates and manages image numbers in an order in which image data is stored in the memory card 40. In particular, typically, the image printing unit 42 generates the image number according to the order in which the corresponding image data has been stored in the memory card 40 and transmits the image number to the PC 44.

Figure 4:
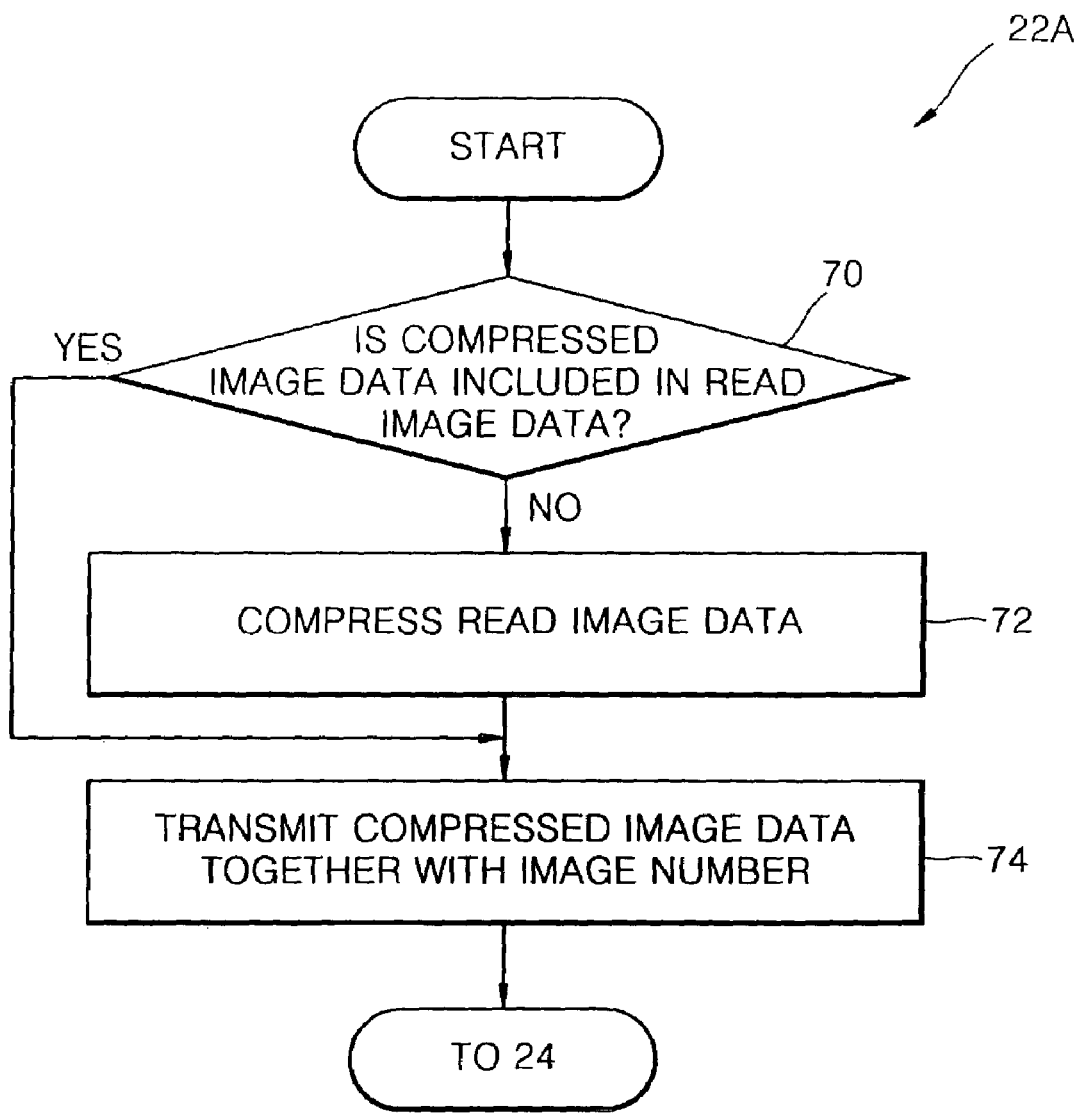
FIG. 4 is a flowchart of an embodiment of operation 22 shown in FIG. 1.

FIG. 4 is a flowchart of FIG. 1 operation 22, according to an embodiment 22A of the present invention. In operations 70 through 74, the diminished image data is obtained and transmitted by the image printing unit 42. More specifically, if it is determined that the memory card 40 with image data has been inserted into the image printing unit 42 and that the image printing unit 42 has been connected to the PC 44 (i.e., operations 20 and 50 through 54), at operation 70, the image printing unit 42 automatically determines whether the diminished image data is included in the image data read from the memory card 40 without a user's special command.

If, at operation 70, it is determined that the diminished image data is not included in the image data read from the memory card 40, at operation 72, the image data read from the memory card 40 is diminished (i.e., compressed). However, if determined at operation 70 that the diminished image data is included in the image data read from the memory card 40, or after operation 72, at operation 74, the diminished image data is transmitted from the image printing unit 42 to the PC 44 together with the image number. After operation 74, the method progresses to FIG. 1 operation 24. Typically, the image printing unit 42 can temporarily store the diminished image data before transmitting it to the PC 44. For example, in the case of Joint Picture Expert Group (JPEG) images, the diminished image data can be included in a header portion based upon a data format in which the image data is stored in the memory card 40.

After operation 22, at operation 24, the PC 44 stores the diminished image data and the image number transmitted from the image printing unit 42. Typically, the PC 44 matches the diminished image data with the image number when storing them for management. After operation 24, at operation 26, the PC 44 displays diminished image data corresponding to an image number, which is selected by the user at the image printing unit 42 and provided from the image printing unit 42, from among the stored diminished image data, on the monitor 46. Typically, the diminished image data displayed on the monitor 46 is a thumbnail image. When an image number is not provided from the image printing unit 42 to the PC 44, at operation 26, the PC 44 displays diminished image data that is initially provided from the image printing unit 42 from among the stored diminished image data.

After operation 26, at operation 28, it is determined whether the user has requested to print the image data displayed on the monitor 46. If, at operation 28, it is determined that the user has not requested to print, the method returns to operation 26 (i.e., the PC 44 continues displaying the image data on the monitor 46).

Figure 5:
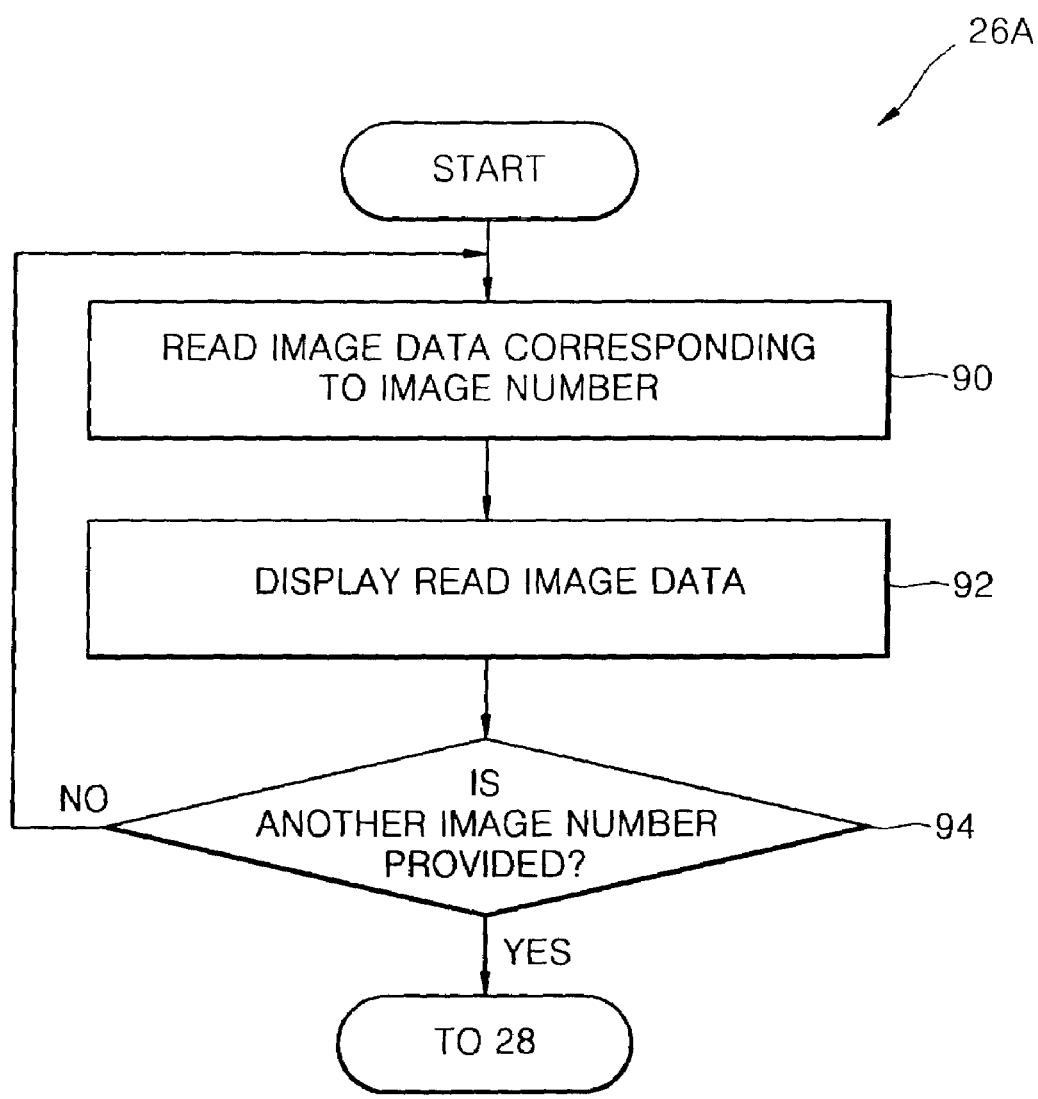
FIG. 5 is a flowchart of an embodiment of operation 26 shown in FIG. 1.

FIG. 5 is a flowchart of FIG. 1 operation 26 according to an embodiment 26A of the present invention. At operations 90 through 92, the diminished image data corresponding to the image number provided from the image printing unit 42 is read and displayed, and, at operation 94, it is determined whether another image number is provided. More specifically, after operation 24, at operation 90, the PC 44 reads the diminished image data corresponding to the image number, which is selected by the user at the image printing unit 42 and provided from the image printing unit 42, from among the diminished image data previously provided from the image printing unit 42 and stored in the PC 44. Typically, when an image number selected by the user does not exist, for example, when a selected image number is not provided from the image printing unit 42 or when an incorrect image number is entered at the image printing unit 42, at operation 90, the PC 44 reads initially, or a preceding, received diminished image data from among the diminished image data previously received from the image printing unit 42 and stored in the PC 44, and displays the read data on the monitor 46.

Typically, because it takes less time for a user to select an image number than for the PC 44 to display image data, before image data corresponding to one image number selected by the user is displayed on the monitor 46, another image number can be selected by the user at the image printing unit 42. In order to overcome such a time difference between when an image number is selected by a user at the image printing unit 42 and when image data is displayed on the monitor 46, two embodiments of operation 90 of the present invention are provided, as follows.

In a first embodiment of operation 90, after FIG. 1 operation 24, the PC 44 ignores an image number provided from the image printing unit 42 while image data is appearing on the monitor 46 and reads diminished image data corresponding to the last image number provided from the image printing unit 42 after the previous image data is completely displayed, and the method progresses to operation 92. When the PC 44 ignores an image number provided from the image printing unit 42, image data corresponding to the image number is not read. The last image number provided from the image printing unit 42 indicates an image number that is most recently input to the PC 44 from the image printing unit 42 in the course of or after completion of displaying a previous image data on the monitor 46. Accordingly, typically, the PC 44 can display image data corresponding to an ignored image number on the monitor 46 only after a previous image data is completely displayed on the monitor 46.

In a second embodiment of operation 90, after FIG. 1 operation 24, the image printing unit 42 provides an image number selected by a user to the PC 44 when the PC 44 is ready to receive a new image number from the image printing unit 42, and the PC 44 reads image data corresponding to the selected image number provided from the image printing unit 42, and the method progresses to operation 92. Typically, the PC 44 is ready to receive a new image number after displaying diminished image data on the monitor 46.

Consequently, when a new image number is selected by a user in the course of displaying image data on the monitor 46, in the first embodiment, the PC 44 ignores the new image number even if the new image number is provided from the image printing unit 42 to the PC 44, and in the second embodiment, the new image number is not provided from the image printing unit 42 to the PC 44 until the PC 44 is ready to receive the new image number.

After operation 90, at operation 92, the PC 44 displays the read image data on the monitor 46. Typically, the size of diminished image data stored in the PC 44 is very small, so the diminished image data corresponding to the image number is displayed on the monitor 46 within a very short period of time after the image number is input to the PC 44 from the image printing unit 42. Typically, the PC 44 can display the read image data in a proper size at a certain position on the monitor 46. The position and size of image data displayed on the monitor 46 can be predetermined and can vary. For example, the size of image data displayed on the monitor 46 can occupy only a part of a full screen of the monitor 46, so a user who wants to print an image can via input image numbers at the image printing unit 42 scroll through images and select a desired image without disturbing another displayed application of the user or another user at the PC 44.

Figure 6:
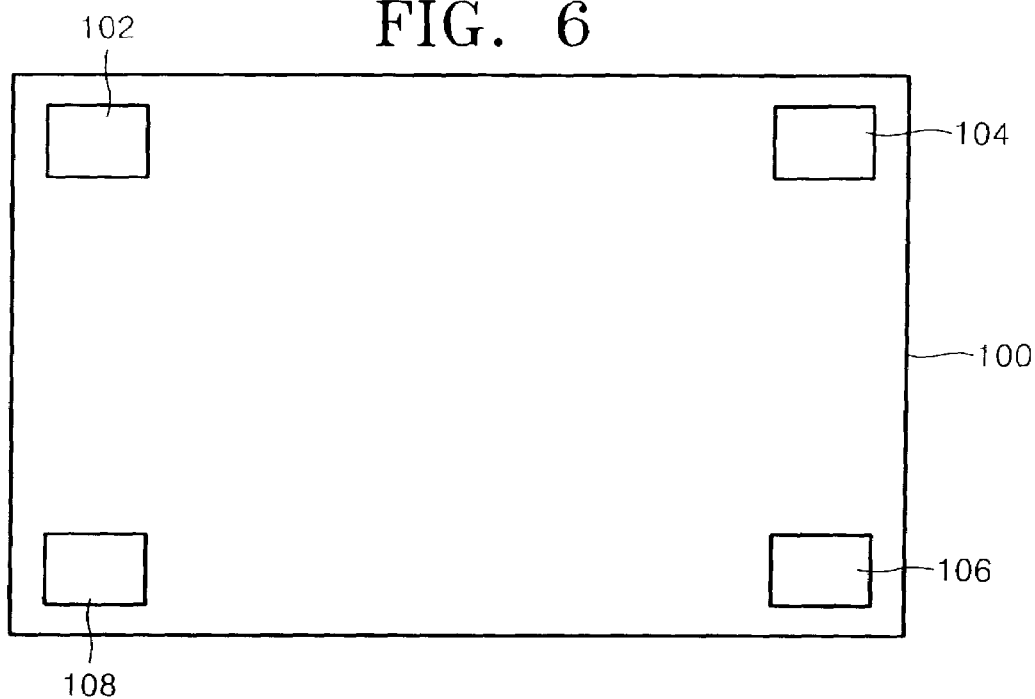
FIG. 6 is a display diagram of image data displayed on a monitor.

FIG. 6 is a display diagram of image data displayed on the monitor 46 at operations 26, 90. As shown in FIG. 6, for example, the size of diminished image data 102, 104, 106 or 108 displayed through the monitor 46 occupies only a part of a full screen 100. A user can previously select a position, at which the diminished image data is to be displayed on the monitor 46, from a plurality of positions, such as the positions of displayed image data 102, 104, 106, and 108 as shown in FIG. 6, and can adjust the selected position later. The image data display size and position can be controlled via input command from the image printing unit 42, or using, for example, a mouse (not shown) at the PC 44.

After operation 92, at operation 94, it is determined whether another image number selected by the user is provided from the image printing unit 42. In other words, at operation 94, for example, it is determined whether the user wants to change image data currently displayed on the monitor 46 into another image data (i.e., scroll through image data). As described above, the user can make different image data to be displayed on the monitor 46 by selecting a different image number in the image printing unit 42.

If, at operation 94, it is determined that another image number is provided, for example, if it is determined that the user wants to display another image data because the image data currently displayed on the monitor 46 is not the one that the user wants to print, the method returns to operation 90. Accordingly, image data corresponding to the newly provided image number is read and displayed on the monitor 46 in operations 90 and 92. However, if, at operation 94, it is determined that no other image number is provided, the method progresses to operation 28 to determine at the image printing unit 42 whether printing of the displayed image data has been requested.

Consequently, as shown in FIG. 5, operations 90 through 94 are repeated until desired image data is displayed on the monitor 46. In particular, in FIG. 1, if, at operation 28, it is determined that the user does not want to print the image data displayed on the monitor 46, the method returns to operation 26 to repeat operations 90 through 94. In other words, since the user does not want to print the image data displayed on the monitor 46, it can be determined whether the user selects another image number. If, at operation 28, it is determined that the user wants to print the image data currently displayed on the monitor 46, at operation 30, the image printing unit 42 prints the image data displayed on the monitor 46.

Figure 7:
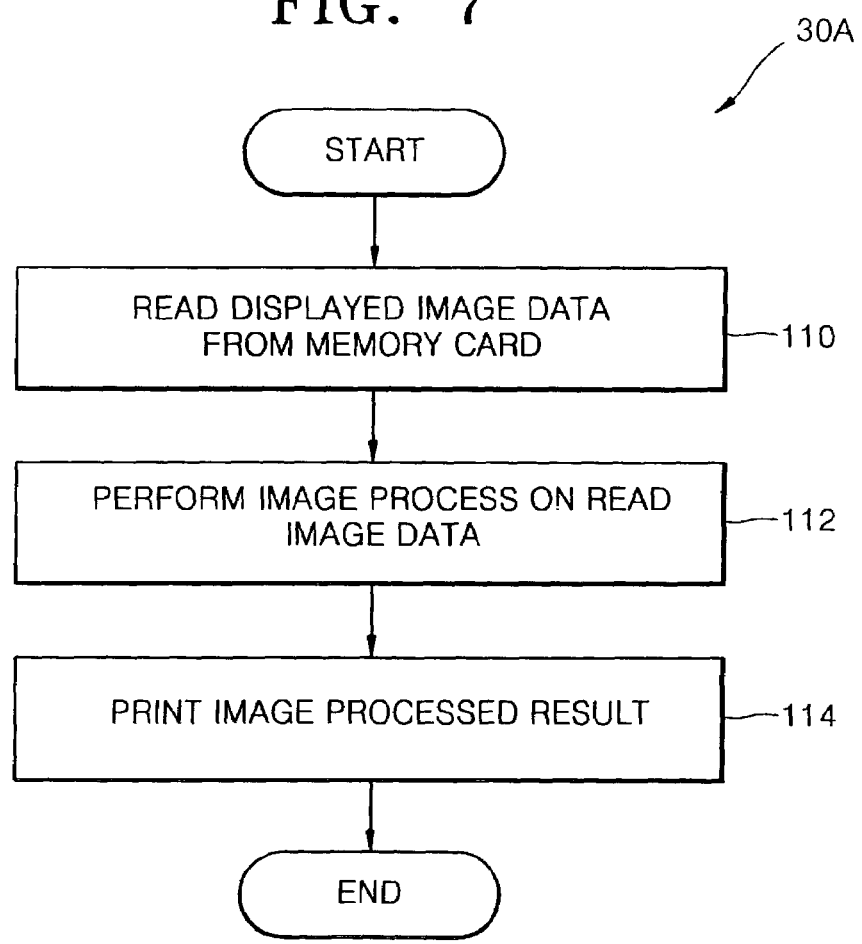
FIG. 7 is a flowchart of an embodiment of operation 30 shown in FIG. 1.

FIG. 7 is a flowchart of FIG. 1 operation 30 according to an embodiment 30A of the present invention. In operations 110 through 114, the image data is read from the memory card 40 by the image printing unit 42, and then the image is processed and printed at and/or by the image printing unit 42.

If, at operation 110, it is determined that the user wants to print the image data displayed on the monitor 46, the image printing unit 42 reads the image data currently displayed on the monitor 46 from the memory card 40. Typically, the image data currently displayed on the monitor 46 is considered as image data that the user wants to print. After operation 110, at operation 112, the image printing unit 42 performs an image process, such as converting the image data read from the memory card 40 into a printable CMYK format. After operation 112, the image printing unit 42 prints the processed image data.

Figure 8:
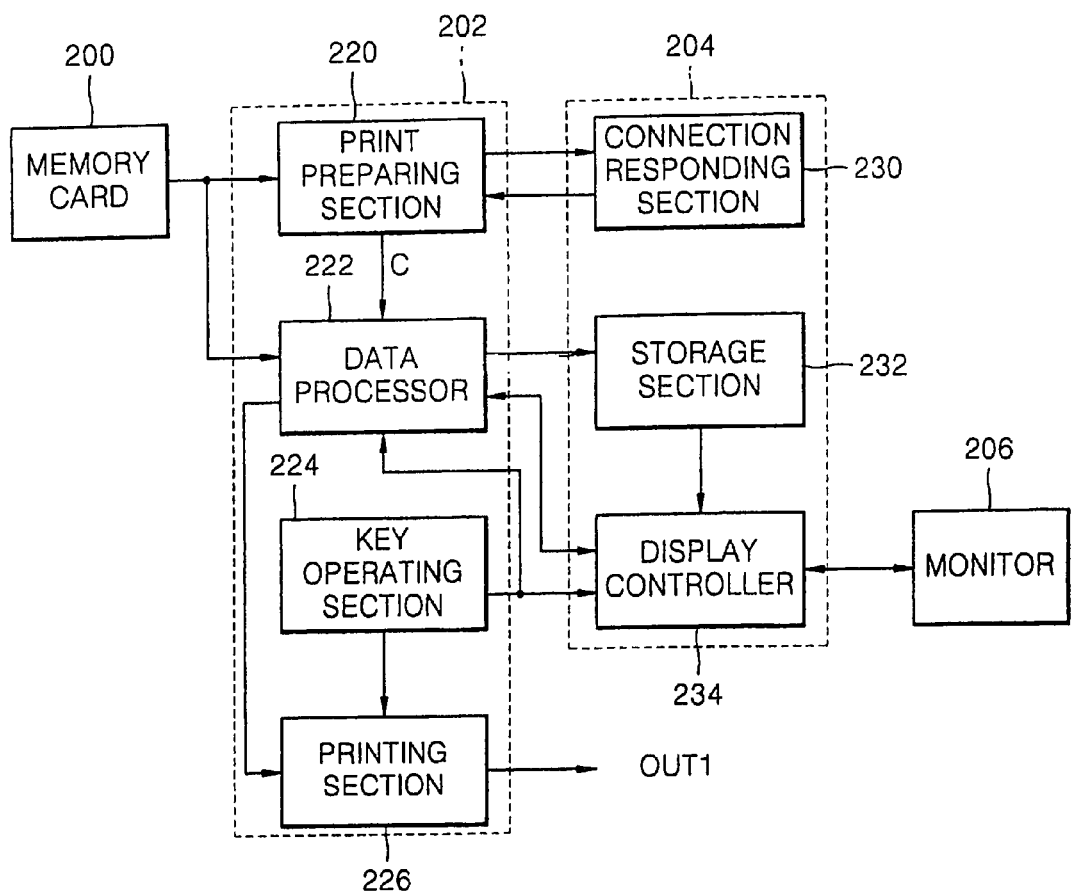
FIG. 8 is a more detailed control block diagram of the apparatus printing the image shown in FIG. 2, according to an embodiment of the present invention.

Hereinafter, the structure and operation of an apparatus printing an image using the above-described method of the present invention will be described with reference to FIGS. 8 through 11. FIG. 8 is a more detailed control block diagram of the apparatus printing the image data shown in FIG. 2, according to an embodiment of the present invention. An image printing unit 202 corresponds to the image printing unit 42 shown in FIG. 2 and comprises a print preparing section 220, a data processor 222, a key operating section 224, and a printing section 226. A PC 204 corresponds to the PC 44 shown in FIG. 2 and comprises a connection responding section 230, a storage section 232, and a display controller 234. A memory card 200 and a monitor 206 correspond to the memory card 40 and the monitor 46, respectively, shown in FIG. 2.

To perform operation 20 shown in FIG. 1, the print preparing section 220 of the image printing unit 202 determines whether the memory card 200 with image data has been inserted in the image printing unit 202 and whether the image printing unit 202 has been connected to the PC 204, and outputs a result of these determinations as a control signal C to the data processor 222 of the image printing unit 202.

Figure 9:
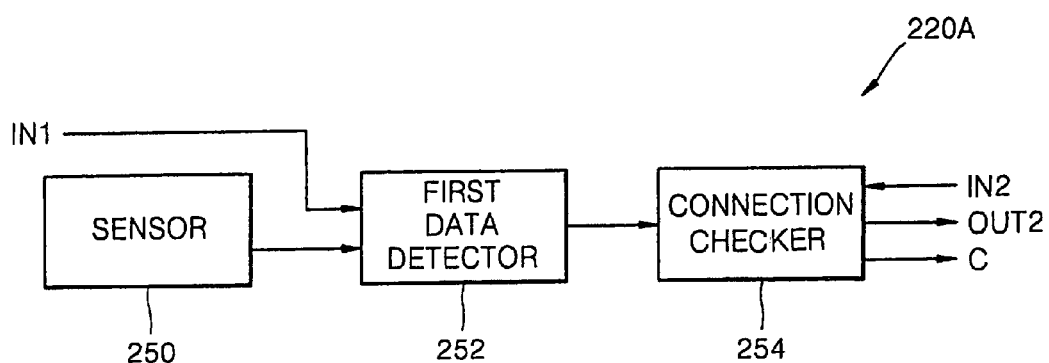
FIG. 9 is a control block diagram of an embodiment of a print preparing section shown in FIG. 8.

FIG. 9 is a control block diagram of an embodiment 220A of the print preparing section 220 shown in FIG. 8, which comprises a sensor 250, a first data detector 252, and a connection checker 254. The print preparing section 220A shown in FIG. 9 performs operation 20 according to the embodiment 20A shown in FIG. 3. In order to perform operation 50 in FIG. 3, the sensor 250 of the print preparing section 220A senses whether the memory card 200 has been inserted in the image printing unit 202 and outputs the result of sensing to the first data detector 252. To perform operation 52 in FIG. 3, the first data detector 252 detects the type of data, which is read from the memory card 200 and input through an input terminal IN1, in response to the result of the sensing received from the sensor 250, and outputs the result of the detection to the connection checker 254. Therefore, after it is recognized that the memory card 200 has been inserted according to the result of sensing received from the sensor 250, the first data detector 252 detects the type of data input through the input terminal IN1.

To perform operation 54 in FIG. 3, the connection checker 254 checks whether the PC 204 has been connected to the image printing unit 202 in response to the result of detection received from the first data detector 252, and outputs the result of checking as a control signal C to the data processor 222. Therefore, after it is recognized that the data stored in the memory card 200 is image data according to the result of detection received from the first data detector 252, the connection checker 254 checks a state of connection between the PC 204 and the image printing unit 202. To check the state of the connection, typically, the connection checker 254 outputs an interrupt protocol to the PC 204 through an output terminal OUT2, checks a response, which is transmitted from the PC 204 and input through an input terminal IN2, and checks whether the image printing unit 202 is connected to the PC 204 based on the response received from the PC 204. For this operation, the PC 204 may be provided with the connection responding section 230. Typically, the connection responding section 230 of the PC 204 transmits the response to the interrupt protocol, which is output from the connection checker 254 of the print preparing section 220 in the image printing unit 202, through the input terminal IN2 to the connection checker 254.

In the meantime, to perform operation 22, the data processor 222 shown in FIG. 8 performs an image process, such as converting the format of image data read from the memory card 200, checks or generates diminished image data in response to the control signal C received from the print preparing section 220, and transmits the generated or checked diminished image data to the PC 204 together with an image number.

Figure 10:
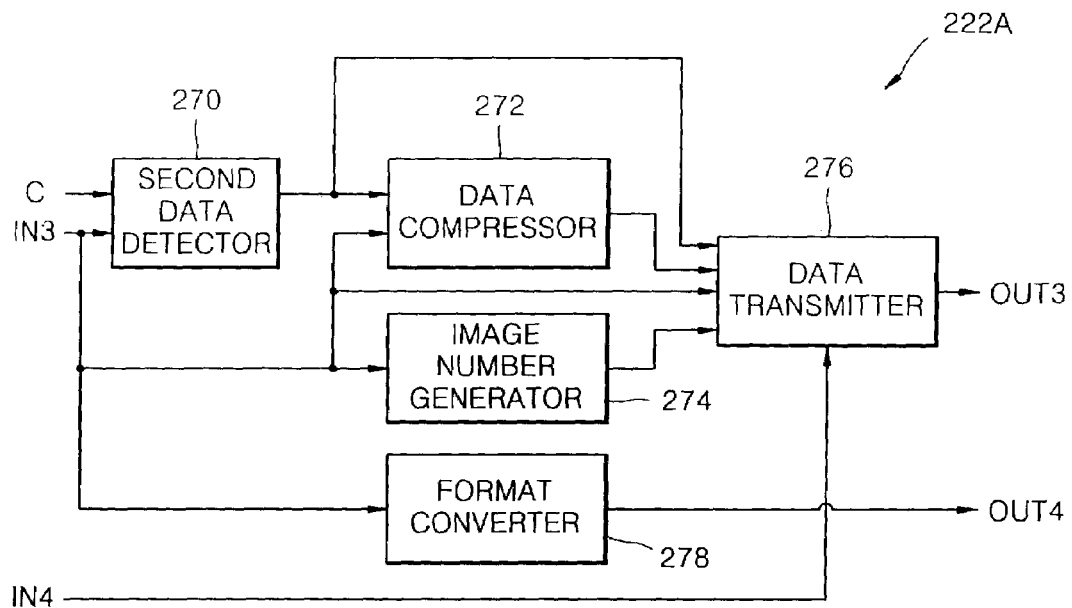
FIG. 10 is a control block diagram of an embodiment of a data processor shown in FIG. 8.

FIG. 10 is a control block diagram of an embodiment 222A of the data processor 222 shown in FIG. 8, which comprises a second data detector 270, a data diminisher (compressor) 272, an image number generator 274, a data transmitter 276, and a format converter 278. In FIG. 10, the data processor 222A, except for the format converter 278, performs FIG. 1, operation 22 according to the embodiment 22A shown in FIG. 4. In FIG. 4, to perform operation 70, the second data detector 270 of the data processor 222A detects whether diminished image data is included in the image data, which is read from the memory card 200 and input through an input terminal IN3, in response to the control signal C received from the print preparing section 220, and outputs the result of detection to the data diminisher 272. Therefore, when it is recognized that the memory card 200 with image data has been inserted and the image printing unit 202 has been connected to the PC 204 according to the control signal C, the second data detector 270 detects the type of data read from the memory card 200 (i.e., the second data detector 270 determines whether the image data read from the memory card 200 is compressed).

To perform FIG. 4 operation 72, the data diminisher 272 generates diminished (i.e., compressed) image data from the image data, which is read from the memory card 200 and input through the input terminal IN3, in response to the result of detection received from the second data detector 270, and outputs the generated diminished image data to the data transmitter 276. In particular, when it is recognized that diminished image data is not included in the image data read from the memory card 200 according to the result of detection received from the second data detector 270, the data diminisher 272 generates diminished image data from the image data read from the memory card 200.

To perform FIG. 4 operation 74, the image number generator 274 and the data transmitter 276 are provided. The image number generator 274 generates an image number, which is uniquely allocated to the image data that is read from the memory card 200 and input through the input terminal IN3, and outputs the image number to the data transmitter 276. In response to the result of detection received from the second data detector 270, or in response to the data compressor 272 compressing the image data read from the memory card 200, the data transmitter 276 transmits the diminished image data to the PC 204 through an output terminal OUT3 together with the image number received from the image number generator 274. For example, when it is recognized based on the result of detection received from the second data detector 270 that diminished image data is not included in the read image data, the data transmitter 276 transmits the diminished image data generated by the data diminisher 272 to the PC 204 through the output terminal OUT3 together with the image number received from the image number generator 274. However, when it is recognized based on the result of detection received from the second data detector 270 that diminished image data is included in the image data, the data transmitter 276 transmits the diminished image data, which is read from the memory card 200 and input through the input terminal IN3, to the PC 204 through the output terminal OUT3 together with the image number received from the image number generator 274.

The format converter 278 (FIG. 10) performs FIG. 7 operation 112. To perform operation 112 shown in FIG. 7, the format converter 278 shown in FIG. 10 converts an RGB format of the image data received from the memory card 200 through the input terminal IN3 into a CMYK format, and outputs the image data having the CMYK format to the printing section 226 of the image printing unit 202 through an output terminal OUT4.

To perform operation 24 shown in FIG. 1, the storage section 232 of the PC 204 stores the diminished image data and the image number, which are received from the data processor 222 of the image printing unit 202. The storage section 232 may be a main storage of the PC 204 or an auxiliary memory such as a hard disk. To perform FIG. 1 operation 26, the display controller 234 of the PC 204 reads diminished image data, which corresponds to an image number selected through the key operating section 224 of the image printing unit 202, from the storage section 232, and outputs the read diminished image data to the monitor 206. The monitor 206 receives the diminished image data from the display controller 234 of the PC 204 and displays the diminished image data. Typically, to generate the selected image number, the image printing unit 202 is provided with the key operating section 224. The key operating section 224 is operated by a user to select, for example, one image number from among image numbers generated by the image number generator 274 (i.e., generated by the data processor 222 as shown in FIG. 10).

To select one image number, the key operating section 224 can be provided with a plurality of keys (not shown), such as an up key and a down key. In this case, a user can increase an image number using the up key or decrease the image number using the down key. The image number selected using the key operating section 224 can be output to the display controller 234 through the data processor 222 shown in FIG. 8 and according to the embodiment 222A in FIG. 10. In this case, the data transmitter 276 shown in FIG. 10 receives the selected image number through an input terminal IN4 from the key operating section 224, and transmits the received image number to the display controller 234 of the PC 204 through the output terminal OUT3. Alternatively, as shown in FIG. 8, the image number selected using the key operating section 224 can be directly transmitted to the display controller 234 without passing through the data processor 222.

Figure 11:
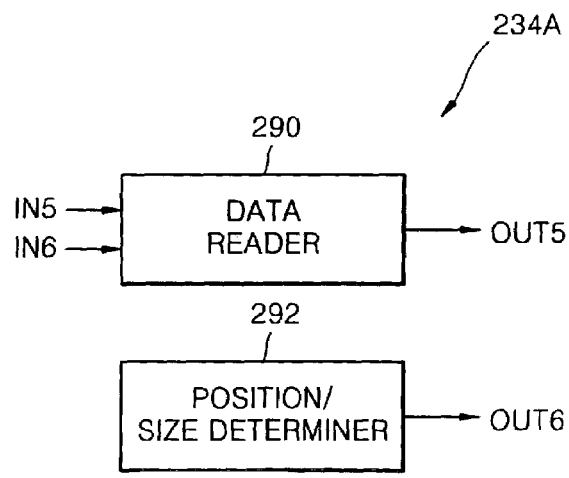
FIG. 11 is a control block diagram of an embodiment of a display controller shown in FIG. 8.

FIG. 11 is a control block diagram of an embodiment 234A of the display controller 234 of the PC 204 shown in FIG. 8, which comprises a data reader 290 and a position/size determiner 292. To perform operations 90 and 92 shown in FIG. 5, the data reader 290 of the display controller 234 reads, from the storage section 232 of the PC 204, through an input terminal IN6 diminished image data, which corresponds to the selected image number that is generated from the key operating section 224 of the image printing unit 202 and received from the image printing unit 202 through an input terminal IN5, and outputs the diminished image data to the monitor 206 through an output terminal OUT5. Accordingly, the image data read by and output from the data reader 290 of the PC 204 can be displayed through the monitor 206.

According to an aspect of the present invention, the display controller 234 of the PC 204 also comprises the position/size determiner 292. The position/size determiner 292 determines a position at which the image data read from the storage section 232 is displayed on a screen of the monitor 206 and a size of the image data to be displayed thereon, and outputs the determined position and size to the monitor 206 through an output terminal OUT6. The monitor 206 displays the diminished image data in the determined size at the determined position on the screen. According to the present invention, the position and size output from the position/size determiner 292 to the monitor 206 can be predetermined and can vary.

To perform FIG. 1 operation 28, the key operating section 224 of the image printing unit 202 generates a print request signal requesting to print image data, in response to a user's operation, and outputs the print request signal to the printing section 226 of the image printing unit 202. For this operation, the key operating section 224 can be provided with a separate print request key (not shown) requesting to print an image. To perform FIG. 1 operation 30, the printing section 226 prints the image data having the CMYK format, which is received from the data processor 222 (i.e., the format converter 278 as shown in FIG. 10), in response to the print request signal received from the key operating section 224, and outputs the printed result through an output terminal OUT1. For example, when it is recognized through the print request signal that the displayed image data is requested to be printed, the printing section 226 prints the image data having the CMYK format received from the format converter 278 of the data processor 222A. Typically, the printed image data is currently displayed on the monitor 206. However, the size of the currently displayed image may not be the same as the printed image. For example, when diminished image data is not included in image data read from the memory card 200, the size of displayed image data may not be the same as that of printed image data, because typically the displayed image data may still be displayed as diminished image data.

In FIG. 1, at operation 28, when another image number is not provided, the key operating section 224 can check whether a user requests printing by operating the keys of the key operating section 224 when an image number is not selected. In particular, to perform FIG. 5 operation 94 when printing is not requested, the key operating section 224 can check whether the user selects another image signal by operating the keys of the key operating section 224, when it is recognized that printing is not requested.

According to an aspect of the present invention, unlike the apparatus shown in FIG. 8, data communication paths between the image printing unit 202 and the PC 204 can be integrated. For the integrated communication path, an interface section (not shown) interfacing the image printing unit 202 with the PC 204 can be separately provided in the image printing unit 202 and in the PC 204. In this case, the print preparing section 220 and the connection responding section 230 transmit and receive data through the interface section, the data processor 222 transmits diminished image data and an image number to the storage section 232 through the interface section, and an image number selected in the key operating section 224 is transmitted to the display controller 234 through the interface section. For example, the interface section can be a Universal Serial Bus (USB) interface section, which also comprises a USB cable.

As described above, in an apparatus and method for printing an image using a memory card according to the present invention, a user can scroll through images and print a desired image displayed on the monitor 46 (i.e., 206) by operating only the image printing unit 42 (i.e., 202) without the assistance of expensive separate display equipment at the imaging printing unit 42, such as a TFT-LCD, without operating a special application program to control image data display, manipulation, and printing at a PC, and without disturbing the user's other executing applications or another user of the PC, so that the user can selectively read a desired image from the memory card and easily print the image at a low cost. In particular, according to the present invention, the PC 44 and monitor 46 are not integrated components of the image printing unit 42, but are in communication with the image printing unit 42 and controlled by image printing unit 42 to display image data for image data print selection by the user at the image printing unit 42.

Therefore, the present invention provides a computer system printing an image using an image printing unit, which prints the image read from an external memory card, and a personal computer connected to the image printing unit. If the memory card with the image data has been inserted into the image printing unit and the image printing unit has been connected to the personal computer, the read image data and a user selected image number are transmitted to the personal computer for displaying by the personal computer. The image printing unit prints the displayed image data corresponding to the user selected image number in response to a user print request at the image printing unit. Accordingly, the present invention allows an image printing unit to remotely control image data display and manipulation and local printing of the remotely displayed image data. The processes of the present invention as shown in FIG. 1 are implemented in computing hardware and/or software in an image printing apparatus and a computer system in communication with the image printing apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of printing an image using an image display-free printing unit, which prints an image corresponding to image data read from an external memory card, and a personal computer, which is connectable to the image display-free printing unit, the method comprising:
   checking for or generating compressed image data from the external memory card in the image display-free printing unit;
   transmitting the compressed image data to the personal computer together with an image number;
   storing the compressed image data and the image number transmitted from the image display-free printing unit in the personal computer;
   remotely controlling, by the image display-free printing unit, displaying by the personal computer the image data transmitted from the image display-free printing unit; and
   printing at the image display-free printing unit the displayed image data in response to a user print request at the image display-free printing unit,
   wherein a size of image data displayed on a monitor occupies part of a full screen of the monitor and a user prints the image at the image display-free printing unit by selecting a desired image while another application of the user or another user is contemporaneously displayed on the monitor.

2. The method of claim 1, further comprising:
   determining whether the memory card with the image data has been inserted into the display-free image printing unit and whether the display-free image printing unit has been connected to the personal computer;
   wherein the compressed image data is checked for or generated upon the determining of insertion of the memory card into the display-free image printing unit and connection of the display-free image printing unit to the personal computer.

3. The method of claim 2, wherein the determining comprises:
   determining whether data stored in the memory card is the image data, if determined that the memory card has been inserted into the display-free image printing unit; and
   determining whether the display-free image printing unit has been connected to the personal computer, if determined that the data stored in the memory card is the image data.

4. The method of claim 1, wherein if the user does not request to print the displayed image data, the displaying of the image data at the personal computer continues.

5. The method of claim 1, wherein the checking for or the generating of the compressed data comprises:
   determining whether the image data read from the memory card includes compressed image data; and
   compressing the image data, if determined that the image data read from the memory card does not include the compressed image data.

6. The method of claim 1, wherein the displaying of the image data comprises:
   reading by the personal computer the image data corresponding to a user selected image number at the display-free image printing unit and transmitted from the display-free image printing unit to the personal computer; and
   displaying the read image data.

7. The method of claim 6, wherein the reading of the image data comprises:
   ignoring the image number provided from the display-free image printing unit as a last image number, if a previous image data is being displayed; and
   reading the image data corresponding to the last image number after the previous image data is completely displayed.

8. The method of claim 6, wherein the displaying of the image data further comprises:
   transmitting the user selected image number to the personal computer, if the personal computer is ready to receive a new image number; and
   reading by the personal computer the image data corresponding to the user selected image number provided from the display-free image printing unit.

9. The method of claim 1, wherein the personal computer includes a monitor, and the image data is displayed in a predetermined size at a predetermined position on the monitor.

10. The method of claim 9, wherein the predetermined size occupies a part of a screen of the monitor.

11. The method of claim 1, wherein the image data is displayed according to a variable size at a variable position.

12. The method of claim 1, wherein the printing of the image data comprises:
   reading at the display-free image printing unit the displayed image data from the memory card in response to the user print request;
   image processing the read image data; and
   printing the image-processed image data.

13. A computer system printing an image using an image display-free printing unit, which prints an image corresponding to image data read from an external memory card, and a personal computer with a monitor which is connectable to the image display-free printing unit,
   the image display-free printing unit comprising:
   a print preparing section determining whether the memory card with the image data has been inserted into the image display-free printing unit and whether the image display-free printing unit has been connected to the personal computer, and outputting a determination result as a control signal, wherein the image display-free printing unit remotely controls display, on the monitor, of the image data read from the memory card;
   a data processor processing the image data read from the memory card, checking for or generating compressed image data in response to the control signal, and transmitting the compressed image data to the personal computer together with an image number;
   a key operating section operated by a user to select the image number and outputting a print request signal requesting to print the image data corresponding to the user selected image number; and
   a printing section printing the image-processed image data received from the data processor in response to the print request signal, the personal computer comprising:
   a storage storing the compressed image data and the image number transmitted from the data processor; and
   a display controller reading, from the storage, the image data corresponding to the user selected image number at the image display-free printing unit and displaying the read image data on the monitor,
   wherein a size of image data displayed on the monitor occupies part of a full screen of the monitor and the user prints the image at the image display-free printing unit by selecting a desired image while another application of the user or another user is contemporaneously displayed on the monitor.

14. The apparatus of claim 13, wherein the print preparing section comprises:
   a sensor sensing whether the memory card has been inserted and outputting a sensing result;
   a first data detector detecting a type of data read from the memory card in response to the sensing result; and
   a connection checker checking whether the personal computer has been connected to the display-free image printing unit in response to a detection result received from the first data detector and outputting a connection check control signal.

15. The apparatus of claim 13, wherein the data processor comprises:
   a second data detector detecting whether the image data read from the memory card includes the compressed image data in response to the control signal;
   a data compressor compressing the image data read from the memory card in response to a detection result received from the second data detector;
   an image number generator generating the image number to be uniquely allocated to the image data read from the memory card;
   a data transmitter transmitting the compressed image data received from the memory card or from the data compressor to the personal computer together with the generated image number received from the image number generator, in response to the detection result received from the second data detector, and transmitting the user selected image number received from the key operating section to the personal computer; and
   a format converter converting an RGB format of the image data read from the memory card into a CMYK format and outputting the image data having the CMYK format to the printing section.

16. The apparatus of claim 13, wherein the display controller comprises a data reader reading, from the storage, the image data corresponding to the user selected image number, which is generated in the key operating section and transmitted from the display-free image printing unit, and outputting the read image data to the monitor for the displaying.

17. The apparatus of claim 13, wherein the display controller comprises:
   a position/size determiner determining a position at which the read image data is to be displayed on the monitor and a size of the read image data to be displayed, and the monitor displays the read image data according to the determined size at the determined position.

18. The apparatus of claim 17, wherein the position/size determiner varies the display position and size of the image data and outputs the varied results to the monitor.

19. A display-free image printing unit, comprising:
   a programmed processor controlling remote image data display and manipulation and printing locally the remotely displayed image data,
   wherein the programmed processor further detects insertion of a memory card with the image data into the display-free image printing unit and detects connection of the display-free image printing unit to a personal computer, transmits image data read from the memory card comprising a generated image number to the personal computer, transmits a user selected image number to the personal computer to display the image data corresponding to the user selected image number, and prints the displayed image data corresponding to the user selected image number in response to a user print request at the display-free image printing unit.

20. The display-free image printing unit of claim 19, wherein the programmed processor remotely controls the image data display size and position.

* * * * *

UNITED STATES PATENT AND TRADEMARK OFFICE
CERTIFICATE OF CORRECTION

PATENT NO.      : 7,554,688 B2
APPLICATION NO. : 10/600338
DATED           : June 30, 2009
INVENTOR(S)     : Seung-young Choi It is certified that error appears in the above-identified patent and that said Letters Patent is hereby corrected as shown below:

Column 12, Line 14, change "computer;" to --computer,--.

Column 13, Lines 12-49, change
"13.     A computer system printing an image using an image display-free printing unit, which prints an image corresponding to image data read from an external memory card, and a personal computer with a monitor which is connectable to the image display-free printing unit,
          the image display-free printing unit comprising:
          a print preparing section determining whether the memory card with the image data has been inserted into the image display-free printing unit and whether the image display-free printing unit has been connected to the personal computer, and outputting a determination result as a control signal, wherein the image display-free printing unit remotely controls display, on the monitor, of the image data read from the memory card;
          a data processor processing the image data read from the memory card, checking for or generating compressed image data in response to the control signal, and transmitting the compressed image data to the personal computer together with an image number;
          a key operating section operated by a user to select the image number and outputting a print request signal requesting to print the image data corresponding to the user selected image number; and
          a printing section printing the image-processed image data received from the data processor in response to the print request signal, the personal computer comprising:
          a storage storing the compressed image data and the image number transmitted from the data processor; and
          a display controller reading, from the storage, the image data corresponding to the user selected image number at the image display-free printing unit and displaying the read image data on the monitor,
          wherein a size of image data displayed on the monitor occupies part of a full screen of the monitor and the user prints the image at the image display-free printing unit by selecting a desired image while another application of the user or another user is contemporaneously displayed on the monitor." to
--13.    A computer system printing an image using an image display-free printing unit, which prints an image corresponding to image data read from an external memory card, and a personal computer with a monitor which is connectable to the image display-free printing unit,

UNITED STATES PATENT AND TRADEMARK OFFICE
CERTIFICATE OF CORRECTION

PATENT NO. : 7,554,688 B2
APPLICATION NO. : 10/600338
DATED : June 30, 2009
INVENTOR(S) : Seung-young Choi It is certified that error appears in the above-identified patent and that said Letters Patent is hereby corrected as shown below:

the image display-free printing unit comprising:
    a print preparing section determining whether the memory card with the image data has been inserted into the image display-free printing unit and whether the image display-free printing unit has been connected to the personal computer, and outputting a determination result as a control signal, wherein the image display-free printing unit remotely controls display, on the monitor, of the image data read from the memory card;
    a data processor processing the image data read from the memory card, checking for or generating compressed image data in response to the control signal, and transmitting the compressed image data to the personal computer together with an image number;
    a key operating section operated by a user to select the image number and outputting a print request signal requesting to print the image data corresponding to the user selected image number; and
    a printing section printing the image-processed image data received from the data processor in response to the print request signal,
    the personal computer comprising:
    a storage storing the compressed image data and the image number transmitted from the data processor; and
    a display controller reading, from the storage, the image data corresponding to the user selected image number at the image display-free printing unit and displaying the read image data on the monitor,
    wherein a size of image data displayed on the monitor occupies part of a full screen of the monitor and the user prints the image at the image display-free printing unit by selecting a desired image while another application of the user or another user is contemporaneously displayed on the monitor.--.

Signed and Sealed this

Tenth Day of November, 2009

David J. Kappos
*Director of the United States Patent and Trademark Office*